Patented Jan. 21, 1947

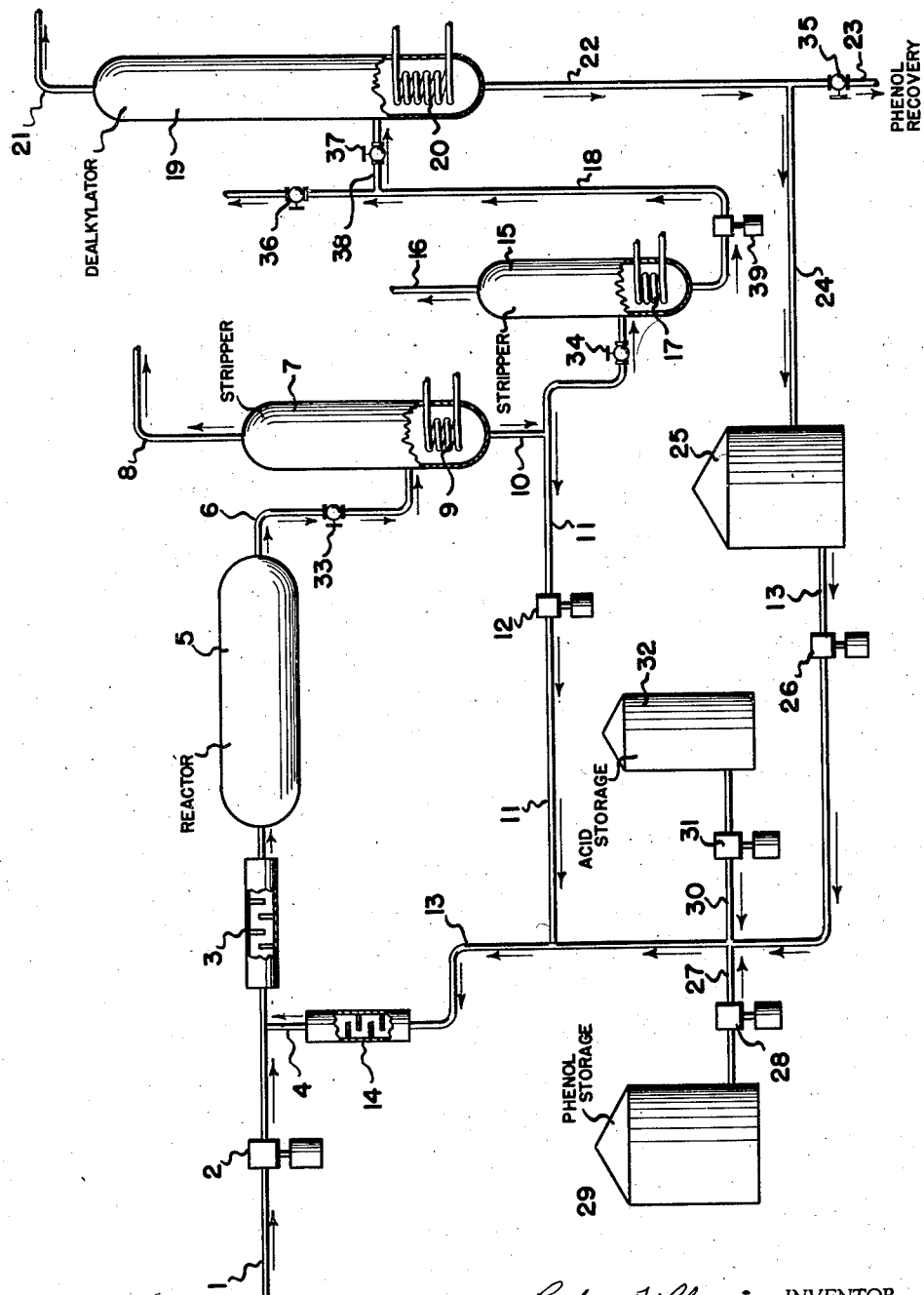

2,414,764

UNITED STATES PATENT OFFICE 2,414,764

METHOD FOR SEPARATING TERTIARY OLEFINS

Reuben F. Pfennig, Goose Creek, Tex., assignor to Standard Oil Development Company, a corporation of Delaware Application December 18, 1942, Serial No. 469,387

7 Claims. (Cl. 260—624)

This invention is concerned with the separation of tertiary olefins from their mixtures with other hydrocarbons with which they are usually associated. More particularly, the invention is concerned with the separation and purification of isobutylene, methylethylethylene and trimethylethylene from hydrocarbons having the same number of carbon atoms.

The mono-olefins, isobutylene, methylethylethylene and trimethylethylene, find wide utility in the production of aviation gasoline and in the preparation of synthetic rubbers, such as butyl rubber. In the manufacture of aviation gasoline and synthetic rubbers it is necessary that the olefins be provided in substantially pure form. Otherwise, in the manufacture of synthetic rubbers, such as butyl rubber, if a tertiary olefin having a purity of less than about 95% were employed, a product of inferior quality would result.

According to the practice of the present invention, it is possible to secure a tertiary olefin of the desired purity which may be separated economically from the hydrocarbons with which it is associated with a minimum amount of equipment and without substantial loss of catalyst or other reagents. In the present invention the hydrocarbon fraction containing the tertiary olefins is reacted in the presence of a catalyst with an hydroxy aromatic compound in one stage to form alkylated derivatives and then dealkylated in a second stage to release the substantially pure tertiary compound. A particular feature of the present invention is the series of operating steps whereby the amount of catalyst and equipment needed in conducting the alkylation and dealkylation reactions is minimized. More particularly for a given amount of through-put, less distillation equipment is required; furthermore, for a given amount of catalyst, larger quantities of tertiary olefins may be recovered by the practice of the present invention than was possible heretofore.

It is, therefore, an object of this invention to provide a process for separating and purifying tertiary olefins from their mixtures with other hydrocarbons in a continuous manner with a minimum amount of catalyst.

Another object of this invention is the provision of a method for recovery of tertiary olefins from their mixtures with other hydrocarbons by debutanizing the reaction product mixture and recycling a portion of the debutanized mixture back to the alkylation stage without dealkylation. Other objects of this invention will become apparent on reading the following description.

In general this invention is concerned with the alkylation of a tertiary olefin such as isobutylene with an hydroxy aromatic compound such as phenol in the presence of an acid catalyst which may be sulfuric acid, sulfonic acids, acid esters and the like, followed by debutanizing the alkylated product. A portion of the debutanized alkylation product is recycled to the alkylation stage without dealkylation to obtain substantially improved yields of tertiary olefins, the other portion being dealkylated for recovery of the tertiary olefins.

The present invention will be better understood by reference to the single figure which is a diagrammatic flow plan of a preferred embodiment of the invention.

Referring now to the drawing, numeral 1 designates a charging line for a hydrocarbon mixture which for purpose of illustration will be assumed to comprise isobutane, isobutylene, normal butane and normal butylenes. This hydrocarbon mixture is pumped by means of pump 2 to incorporator 3 for thorough mixing with phenol and an acid catalyst which is introduced into line 1 by means of line 4 and which will be described in further detail hereinafter. After leaving incorporator 3, the mixture passes to reactor 5 which may be a time tank or other suitable contacting equipment providing sufficient retention time for the reaction to go to completion. The reaction mixture leaving reactor 5 comprises unreacted butylenes, isobutane, normal butane and alkylated phenol which passes by means of line 6 through pressure reducing valve 33 into fractionation tower 7 wherein, by suitable adjustment of temperatures and pressure, the major portion of the unreacted hydrocarbons is taken overhead through line 8 for removal from the system or for further treatment as may be desired. Stripping tower 7 is operated under sufficient pressure so that the hydrocarbons leaving it through line 8 may be liquefied with cooling water at about atmospheric temperatures. Stripping tower 7 is provided with heating means 9 which may be a steam coil, a reboiler or other equivalent heating means.

The partially debutanized alkylated phenol mixture is discharged from stripping tower 7 through line 10 and is then split into two portions: one portion is recycled to line 1 by means of line 11, pump 12, line 13, incorporator 14 and line 4. The other portion is discharged through pressure reducing valve 34 into vacuum stripping tower 15 where the residual unreacted hydrocarbons are removed. It is necessary to use some means for removing residual unreacted hydrocarbons from the alkylated phenols such as by employment of vacuum stripping tower 15, since otherwise it would be necessary to resort to relatively high temperatures for complete debutanization in stripping tower 7 which might result in decomposition of dealkylated phenols and, therefore, loss in yield. It is to be understood that other equivalent means may be substituted for vacuum stripping tower 15, such as injection of a stripping gas into tower 7; however, it is preferred to employ a vacuum stripping tower as described hereinbefore for simplification of the operation. The gases leaving stripping tower 15 are conducted therefrom by means of line 16 and are compressed, cooled, condensed and further handled as may be desired. Heat for stripping tower 15 is provided by heating coil 17 which may be a steam coil, a reboiler or equivalent heating means.

The completely debutanized phenols are then discharged by means of pump 39 from stripper 15 into line 18 which connects by means of branch line 38 to dealkylation tower 19 which in turn is equipped with heating means 20 whereby the temperature of the alkylated phenols is raised to a point so that isobutylene is released therefrom by dealkylation. The isobutylene is conducted away from dealkylation tower 19 by means of line 21 and is liquefied by compression or cooling; preferably dealkylation tower 19 is operated at sufficient pressure so that cooling water may be employed for liquefication. The dealkylated phenols are then discharged from tower 19 by means of line 22 for recycling to the alkylation stage. A portion of the dealkylated phenols may be discarded from the system by means of line 23 to maintain the catalyst strength at an optimum level for efficient operation.

The recycled, dealkylated phenols are discharged by means of line 24 into surge tank 25 from which, in turn, the dealkylated material is pumped by means of pump 26 and lines 13 and 4 back to line 1 for subsequent mixing with the incoming charge material. Provision is made for injection of make-up phenol into line 13 by means of pump 28 in line 27 which connects with phenol storage tank 29. The catalyst concentration necessary for efficient operation may be maintained at the optimum level by injection of sulfuric acid into line 13 by means of pump 31 in line 30 connecting line 13 with acid storage tank 32.

It is to be understood that other acidic material besides sulfuric acid may be employed as the activating agent. For example, it is known in the art to employ sulfonic acids, esters and other similar acidic material for activating the reaction between the phenol and the tertiary olefin.

It is to be understood that in the foregoing embodiment, the dealkylation reaction is carried out with the reactants in the liquid phase. Since temperatures of the order of about 125 to 200° F. are employed in the reaction for the alkylation of isobutylene with phenol it is necessary to employ sufficient pressures to maintain the $C_4$ hydrocarbon in a liquid state throughout the system. Preferably, a temperature of about 170° F. is maintained in reactor 5 for alkylation of isobutylene with phenol. In the dealkylation stage the temperature for removal of substantially all of the condensed isobutylene should be maintained between about 325° F. and about 600° F. It has been found that a temperature of about 400° F. gives the best results. If a temperature higher than 400° F. were employed there is danger of the catalyst life being shortened excessively. When dealkylating at 400° F., compression will be necessary to liquefy the isobutylene. At higher dealkylation temperatures such as about 560° F., pressures of the order of about 80 pounds per square inch should be employed.

In stripping tower 7, temperatures of the order of 240° to 280° F. are maintained and pressures sufficient to allow liquefication of the overhead, removed through line 8, with cooling water, while in vacuum stripping tower 15, lower temperatures of about 120° to 230° F. are maintained. Preferably temperatures of about 140° F. and pressures of about 10 mm. to about 50 mm. absolute give the best results. Since the temperature in stripping tower 7 is much higher than that in stripping tower 15 it may be necessary to provide some means for cooling the material between these two towers to avoid excessive degradation of the alkylated phenol. Otherwise, substantial loss of isobutylene might be realized by release to the gases leaving tower 15 through line 16.

The present invention has been described with relation to the alkylation of isobutylene with phenol and with the subsequent dealkylation for recovery of isobutylene. It is to be understood that the alkylation-dealkylation reaction process per se does not form part of my invention. The present invention is concerned primarily with the utilization and recycling of a portion of the debutanized product to the alkylation stage so that larger amounts of isobutylene may be absorbed and recovered than has been possible heretofore with conventional alkylation-dealkylation of isobutylene and phenol.

This invention is also concerned with the production of alkylated phenols. Alkylated phenols find wide use in the petroleum and other industries as inhibitors. When it is desired to recover alkylated phenols, they may be withdrawn before the dealkylation stage. Therefore, provision is made for withdrawing alkylated phenols from the system by opening valve 36 in line 18 and withdrawing a portion or all of the alkylated product. In cases when all the material is withdrawn for use as alkylated derivatives, then valve 37 in branch line 38 is closed.

Another advantage accruing to operation with recycling in accordance with the present invention is that considerable less stripping facilities are required.

While this invention has been described with relation to alkylation in the liquid phase, it is to be understood that the reaction may be conducted with the phenolic materials in the liquid phase and the olefinic containing hydrocarbons in the vapor phase.

The amount of material recycled to the amount dealkylated will vary inversely with the ratio of hydrocarbon to phenol entering incorporator 3. Generally, the ratio of debutanized material recycled to the material alkylated will range in the neighborhood from about 0.25 to about 8 to 1. Good results have been obtained when employing ratios of about 3 to 1.

The ratio of phenol to hydrocarbon charged into incorporator 3 may vary between about 1 and about 6 to 1; preferably a ratio of about 2 to 1 should be maintained. However, it is to be understood that this ratio may be varied rather widely depending on the type of phenolic material employed as well as the catalyst used to activate the reaction between the tertiary olefin and the phenolic material.

In order to maintain the phenol purity at the desired level, it may be necessary to withdraw or discharge from the system about 5% of the dealkylated material leaving tower 19 through line 22. In most cases, less than this amount will be discharged. It is to be understood that an amount of make-up phenol equivalent to that discharged from line 23 will be required for injection as has been described hereinbefore.

The present invention will be further understood by reference to the following examples in which data obtained during typical operations resulting from operating in accordance with the present invention are compared with data obtained when alkylating various phenolic material with isobutylene in a conventional manner:

EXAMPLE 1

In accordance with the following operations, a petroleum phenol fraction was contacted at 167° F. for one hour with a C4 fraction containing 11.7% by volume of isobutylene. Sulfuric acid in the amount of 1% by weight based on the phenol was employed as the activating agent.

The petroleum phenol fraction was alkylated both conventionally, i. e., without recycling of alkylated material, and in accordance with the present invention with recycling after debutanization. Since the dealkylation operation is well known and the conditions for same well established, the alkylated phenolic material was not dealkylated for recovery of isobutylene in these particular runs.

In the conventional alkylation runs, 100 volumes of petroleum phenols were reacted with 100 volumes of the total olefinic hydrocarbon feed described above under the outlined conditions. Intimate contact between the reactants was maintained in each operation. After elapse of the one hour's contact time, the alkylated petroleum phenols were separated from the unreacted hydrocarbons for determination of the amount of isobutylene reacted with the phenolic material. This was determined either by analysis of the residue gas or by weighing the phenolic material before and after alkylation. In the last instance, it is the debutanized material which is weighed. In the second, third, and fourth runs when operating in a conventional manner, 200, 300, and 400 volumes of fresh olefinic hydrocarbon feed were reacted with 100 volumes of fresh petroleum phenols under the conditions outlined. Similarly to the first run, each reaction product was debutanized and then examined to determine the amount of isobutylene reacted with the petroleum phenols.

The operations of the present invention were conducted as follows: In the first cycle, 100 volumes of petroleum phenols were reacted with 100 volumes of the total olefinic hydrocarbon feed under the specified conditions. After elapse of the one hour contact time, the unreacted hydrocarbons were flash distilled at about 170° F. to leave a debutanized product comprising alkylated petroleum phenols. The alkylated product was then mixed with a second 100 volumes of fresh olefinic hydrocarbon feed and the reaction again allowed to proceed under the same conditions as with the first cycle, all conditions such as time, temperature, etc. being identical. In a like manner, the third and fourth cycle alkylations were conducted, the unreacted hydrocarbons being removed by flash distillation at about 170° F. after each cycle.

The results of the above-described runs are compared in Table I:

*Table I*

| Volumes of hydrocarbon charged per volume of fresh petroleum phenols | | Moles of isobutylene reacted per mol of petroleum phenol | |
|---|---|---|---|
| Conventional operation | Present invention | Conventional operation | Present invention |
| 1 | 1 | 0.18 | 0.18 |
| 2 | 1 | .25 | .31 |
| 3 | 1 | .25 | .41 |
| 4 | 1 | ---- | 1.51 |

¹ Contained 2% catalyst.

These data clearly show that, when operating in accordance with the present invention, considerably larger quantities of isobutylene were alkylated per mol of petroleum phenol reacted than when employing conventional once through operation without recycling. In short, it is obvious from these data that in a once-through alkylation operation, the petroleum phenols will react with additional amounts of isobutylene provided that the unreacted hydrocarbons are removed from the reaction mixture. In conventional practice, the unreacted hydrocarbons are removed by debutanization and the total debutanized product dealkylated, resulting in a loss in efficiency and in consumption of valuable materials.

The data are of particular significance since, in accordance with the present process, it is possible to separate and purify larger quantities of isobutylene for a given amount of petroleum phenols and sulfuric acid employed than was possible heretofore.

EXAMPLE 2

In another series of operations, a commercial grade of anhydrous phenol was alkylated at 168° F. for one hour with the same olefinic hydrocarbon fraction employed in Example 1. In these particular runs, 0.5% by weight of sulfuric acid based on the phenol served as the catalytic agent.

In each case, whether operating in a conventional manner or operating in accordance with the present invention, initially, 200 volumes of total olefinic hydrocarbon feed were reacted with 100 volumes of the phenol. Similar to the operation described in Example 1, in accordance with the present invention, the alkylated phenol was flash distilled after each cycle prior to contacting with additional quantities of feed hydrocarbon.

The results of these runs appear in Table II below; these data clearly show that the present invention allows the reaction of larger quantities of isobutylene than is possible when operating in a conventional manner. The data also show by comparison with Example 1 that either a petroleum phenol fraction or anhydrous phenol may be employed in the practice of the present invention.

Table II

| Volumes of hydrocarbon charged per volume of fresh phenol | | Per cent of fresh phenol employed | | Moles of isobutylene per mol of phenol | |
|---|---|---|---|---|---|
| Conventional operation | Present invention | Conventional operation | Present invention | Conventional operation | Present invention |
| 2 | 2 | 100 | 100 | 0.17 | 0.17 |
| 4 | 2 | 100 | 50 | .36 | .36 |
| 6 | 2 | 100 | 33 | .54 | .58 |
| 8 | 2 | 100 | 25 | .42 | .78 |
| 10 | 2 | 100 | 20 | ---- | .96 |

It is also noteworthy from these data that, while the amount of isobutylene reacted increases with the volumes of hydrocarbon charged in the present invention, in conventional operation an actual decrease was observed after 0.54 mol of isobutylene was reacted.

Example 3

Since, in the dealkylation of alkylated phenol, in a large number of cases, the dealkylation reaction does not proceed past the monobutylphenol, a third series of runs were conducted in which a monobutylphenol resulting from the dealkylation of products from operations similar to those described in Example 2 was re-alkylated with the same olefinic hydrocarbon feed employed in Examples 1 and 2. In this series of operations a reaction temperature of 171° F., a contact time of one hour, and a catalyst comprising 0.5% by weight of sulfuric acid based on the monobutylphenol were employed.

Other conditions of recycling, etc., were similar to those described in Example 2.

The results of these runs listed below in Table III clearly demonstrate that it is possible to dealkylate an alkylated phenol and recycle it to the alkylation stage while operating in accordance with the present invention and obtain increased reaction of the isobutylene with the monobutylphenol over that obtained conventionally. It will be especially noted that when operating with 4 to 6 volumes of hydrocarbon charged per volume of fresh monobutylphenol, the amount of isobutylene reacted was increased by about 50 to over 100%. This is especially advantageous when it is considered that phenols are scarce and expensive materials. Furthermore, by practice of the present invention, it is possible to obtain more complete recovery of the isobutylene with less consumption of activating catalyst than was possible heretofore.

Table III

| Volumes of hydrocarbon charged per volume of fresh monobutylphenol | | Moles of isobutylene reacted per mole of monobutylphenol | |
|---|---|---|---|
| Conventional operation | Present invention | Conventional operation | Present invention |
| 2 | 2 | 0.33 | 0.33 |
| 4 | 2 | .47 | .69 |
| 6 | 2 | .41 | .90 |
| 8 | 2 | -------- | 1.05 |

Although not reflected directly by the data in the several examples, it is not practical to modify the conventional operation by merely recycling the undebutanized alkylated product to the alkylation stage. When the undebutanized alkylated material is admixed with fresh olefinic feed in an effort to secure additional alkylation, precipitation of the catalyst results due to the precipitating effect of the relatively large quantities of light hydrocarbons present. Likewise, when employing initially large ratios of fresh olefinic hydrocarbon feed to fresh phenolic material, precipitation of a large portion of the catalyst also occurs. Therefore, with most or all of the catalyst precipitated, little or substantially no additional alkylation is effected. In the present invention this is substantially avoided.

The present invention is not to be restricted to the several embodiments which are presented solely by way of illustration and not by way of limitation. Other modifications will suggest themselves to those skilled in the art.

The nature and objects of the present invention having been described and illustrated, what I wish to claim as new and useful and to secure by Letters Patent is:

1. A process for obtaining alkylated phenol comprising the steps of passing phenol and a hydrocarbon feed stock including tertiary olefin and a substantial amount of hydrocarbon other than tertiary olefin into a reaction zone, contacting the phenol and hydrocarbon feed stock in the reaction zone with an alkylation catalyst under conditions to cause the alkylation of a substantial portion of the tertiary olefin with phenol, removing a liquid fraction, including alkylated phenol and hydrocarbon, from the reaction zone and distilling to separate at least a major portion of the hydrocarbon from the alkylated phenol to form an alkylated phenol fraction, returning a substantial portion of the alkylated phenol fraction to the reaction zone and dealkylating another substantial portion of the alkylated phenol fraction to recover tertiary olefin therefrom as product.

2. A continuous process for obtaining alkylated phenol comprising the steps of continuously feeding phenol and a hydrocarbon feed stock including tertiary olefin and a substantial amount of hydrocarbon other than tertiary olefin into a reaction zone, contacting the phenol and hydrocarbon feed stock with an alkylation catalyst in the reaction zone under conditions to cause the alkylation of a substantial portion of the tertiary olefin with phenol, continuously removing from the reaction zone a liquid fraction including alkylated phenol and hydrocarbon, passing said liquid fraction to a distillation zone, distilling said fraction in said distillation zone to separate at least a major portion of the hydrocarbon from the alkylated phenol to form an alkylated phenol fraction, continuously returning a substantial portion of the alkylated phenol fraction to the reaction zone and dealkylating another substantial portion of the alkylated phenol fraction to recover tertiary olefin therefrom as product.

3. A process in accordance with claim 2 in which approximately three parts of alkylated phenol fraction is returned to the reaction zone for one part of hydrocarbon feed stock and phenol fed into the reaction zone.

4. A process for obtaining alkylated phenol comprising the steps of forming in a reaction zone a pool of liquid including sulfuric acid, phenol and hydrocarbon feed stock including a substantial portion of tertiary olefin and a substantial portion of hydrocarbons other than tertiary olefin, maintaining the pool in the reaction zone under conditions to cause the alkylation of a substantial portion of the tertiary olefin with phenol, removing from the pool in the reaction zone a liquid fraction comprising alkylated phenol and hydrocarbons, and distilling the fraction in a distillation zone to separate at least the major portion of the hydrocarbons from the alkylated phenol to form an alkylated phenol fraction, removing an alkylated phenol fraction from the distillation zone, continuously mixing a substantial portion of said alkylated phenol fraction in the form of a stream with a stream of phenol and a stream of acid to form a first admixture, intimately contacting a stream of first admixture with a stream of the hydrocarbon feed stock to form a second admixture and continuously passing a stream of said second admixture into the pool in the reaction zone and dealkylating another substantial portion of the alkylated phenol fraction to recover tertiary olefin therefrom as product.

5. A process in accordance with claim 4 in which the second admixture includes approximately three parts of alkylated phenol fraction for one part of hydrocarbon feed stock and phenol.

6. A process in accordance with claim 4 in which the tertiary olefin is isobutylene.

7. A process in accordance with claim 4 in which the tertiary olefin contains five carbon atoms in the molecule.

REUBEN F. PFENNIG.